United States Patent
Arimilli et al.

(10) Patent No.: US 6,249,911 B1
(45) Date of Patent: *Jun. 19, 2001

(54) OPTIMIZING COMPILER FOR GENERATING STORE INSTRUCTIONS HAVING MEMORY HIERARCHY CONTROL BITS

(75) Inventors: Ravi Kumar Arimilli, Austin; John Steve Dodson, Pflugerville; Guy Lynn Guthrie, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/368,756

(22) Filed: Aug. 5, 1999

(51) Int. Cl.[7] .............................. G06F 15/18; G06F 9/45
(52) U.S. Cl. .............................. 717/9; 711/120; 711/122
(58) Field of Search ................................ 717/9; 712/205, 712/207; 711/117, 118, 119, 122, 120, 142

(56) References Cited

U.S. PATENT DOCUMENTS

| | | | |
|---|---|---|---|
| 4,429,363 | * 1/1984 | Duke et al. ........................ | 711/122 |
| 5,386,547 | 1/1995 | Jouppi .................................. | 711/122 |
| 5,579,493 | * 11/1996 | Kiuchi et al. ........................ | 712/207 |
| 5,623,627 | 4/1997 | Witt .................................... | 711/122 |
| 5,721,864 | * 2/1998 | Chiarot et al. ...................... | 712/207 |
| 5,724,549 | * 3/1998 | Selgas et al. ....................... | 711/141 |
| 5,774,685 | * 6/1998 | Dubey ................................ | 712/205 |
| 5,809,522 | * 9/1998 | Novak et al. ....................... | 711/118 |
| 5,829,038 | * 10/1998 | Merrell et al. ..................... | 711/143 |

* cited by examiner

Primary Examiner—David L. Robertson
(74) Attorney, Agent, or Firm—Casimer K. Salys; Bracewell & Patterson, L.L.P.

(57) ABSTRACT

An optimizing compiler for generating STORE instructions having memory hierarchy control bits is disclosed. The compiler first converts a first STORE instruction to a second STORE instruction. The compiler then provides an operation code field within the second instruction for indicating an updating operation. The compiler further provides a vertical write-through level field within the second instruction for indicating a vertical memory level and a horizontal memory level within a multi-level memory hierarchy to which the updating operation should be applied.

7 Claims, 4 Drawing Sheets

OPTIMIZING COMPILER FOR GENERATING STORE INSTRUCTIONS HAVING MEMORY HIERARCHY CONTROL BITS

RELATED PATENT APPLICATIONS

The present patent application is related to copending applications:

1. U.S. Ser. No. 09/368753, filed on even date, entitled "A STORE INSTRUCTION HAVING VERTICAL MEMORY HIERARCHY CONTROL BITS";
2. U.S. Ser. No. 09/368754, filed on even date, entitled "A STORE INSTRUCTION HAVING HORIZONTAL MEMORY HIERARCHY CONTROL BITS"; and
3. U.S. Ser. No. 09/368755, filed on even date, entitled "AN APPARATUS FOR ADJUSTING A STORE INSTRUCTION HAVING MEMORY HIERARCHY CONTROL BITS".

BACKGROUND OF THE INVENTION

1. Technical Field

The present invention relates to data processing in general, and in particular to a software compiler. Still more particularly, the present invention relates to an optimizing compiler for generating STORE instructions having memory hierarchy control bits.

2. Description of the Prior Art

Compilers are software that convert source code written in a high-level programming language, such as C or C++, to object code that can be executed by a processor within a data processing system. In other words, a compiler translates high-level instructions into low-level machine code that can be read and understood by the processor. In addition to converting source code to object code, most modern compilers are also capable of optimizing individual instructions in order to increase the performance of the executable code. This optimization is performed in several discrete steps. Optimization begins with various high-level optimization steps performed at a procedural level by a code optimizer. Such high-level optimization steps include so-called procedure inlining, loop transformations, and global restructuring and analysis. The remaining optimization steps form the "back end" of the code optimizer.

Most multiprocessor data processing systems typically include a multi-level memory hierarchy. However, instructions generated by prior art compilers are not optimized to take advantage of the multi-level memory hierarchy. The present disclosure details an optimizing compiler that is capable of generating STORE instructions having memory hierarchy control bits for updating data within a multi-level memory hierarchy of a multiprocessor data processing system.

SUMMARY OF THE INVENTION

In accordance with a preferred embodiment of the present invention, a compiler first converts a first STORE instruction to a second STORE instruction. The compiler then provides an operation code field within the second instruction for indicating an updating operation. The compiler further provides a vertical write-through level field within the second instruction for indicating a vertical memory level and a horizontal memory level within a multi-level memory hierarchy to which the updating operation should be applied.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
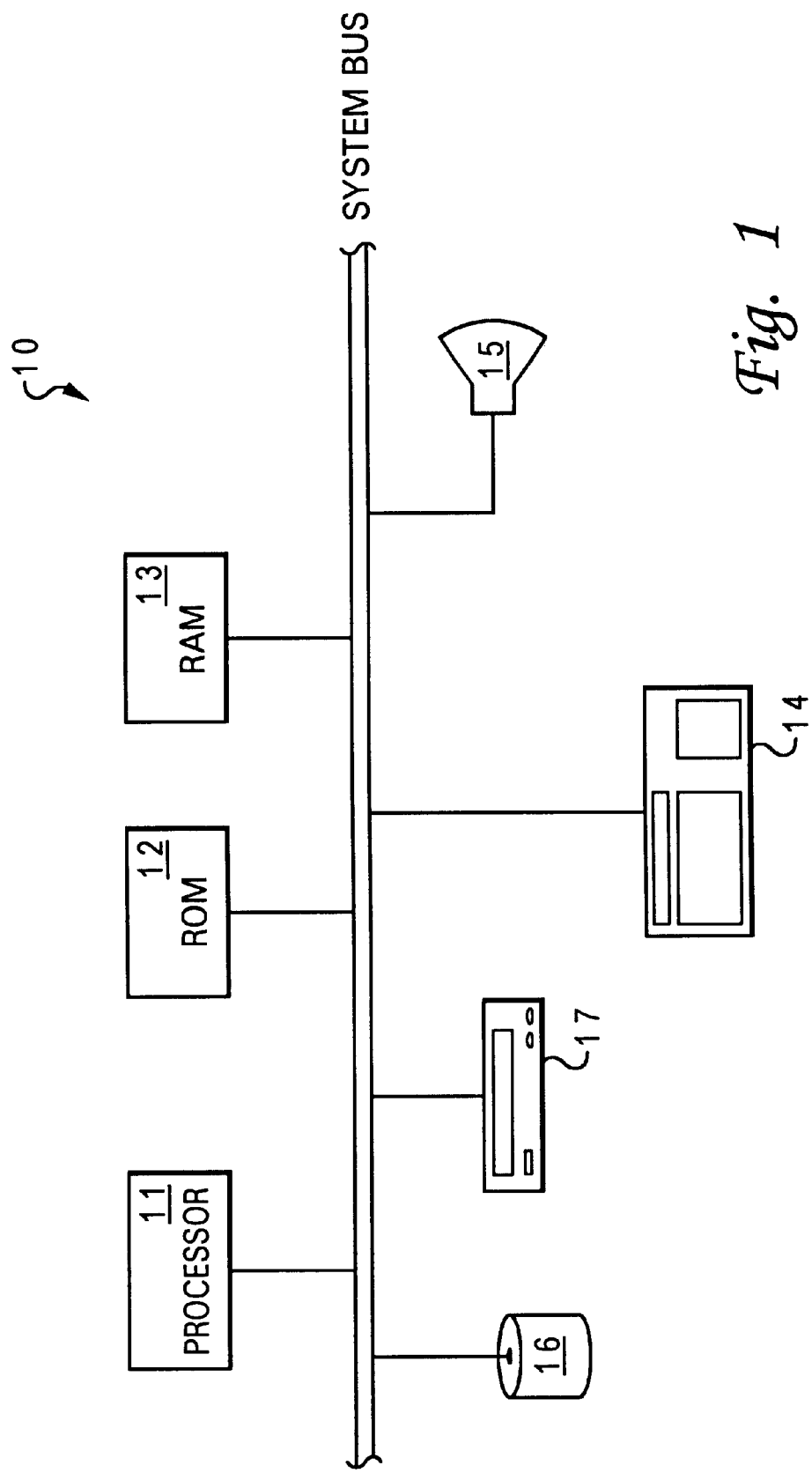
FIG. 1 is a block diagram of a computer system capable of executing an optimizing compiler in accordance with a preferred embodiment of the present invention.

Referring now to the drawings and, in particular, to FIG. 1, there is illustrated a block diagram of a computer system capable of executing an optimizing compiler in accordance with a preferred embodiment of the present invention. As shown, a computer system 10 includes a processor 11, a read only memory (ROM) 12, a random access memory (RAM) 13, and various input/output devices such as a keyboard 14, a video monitor 15, a hard disk drive 16, and a CD-ROM drive 17.

Figure 2:
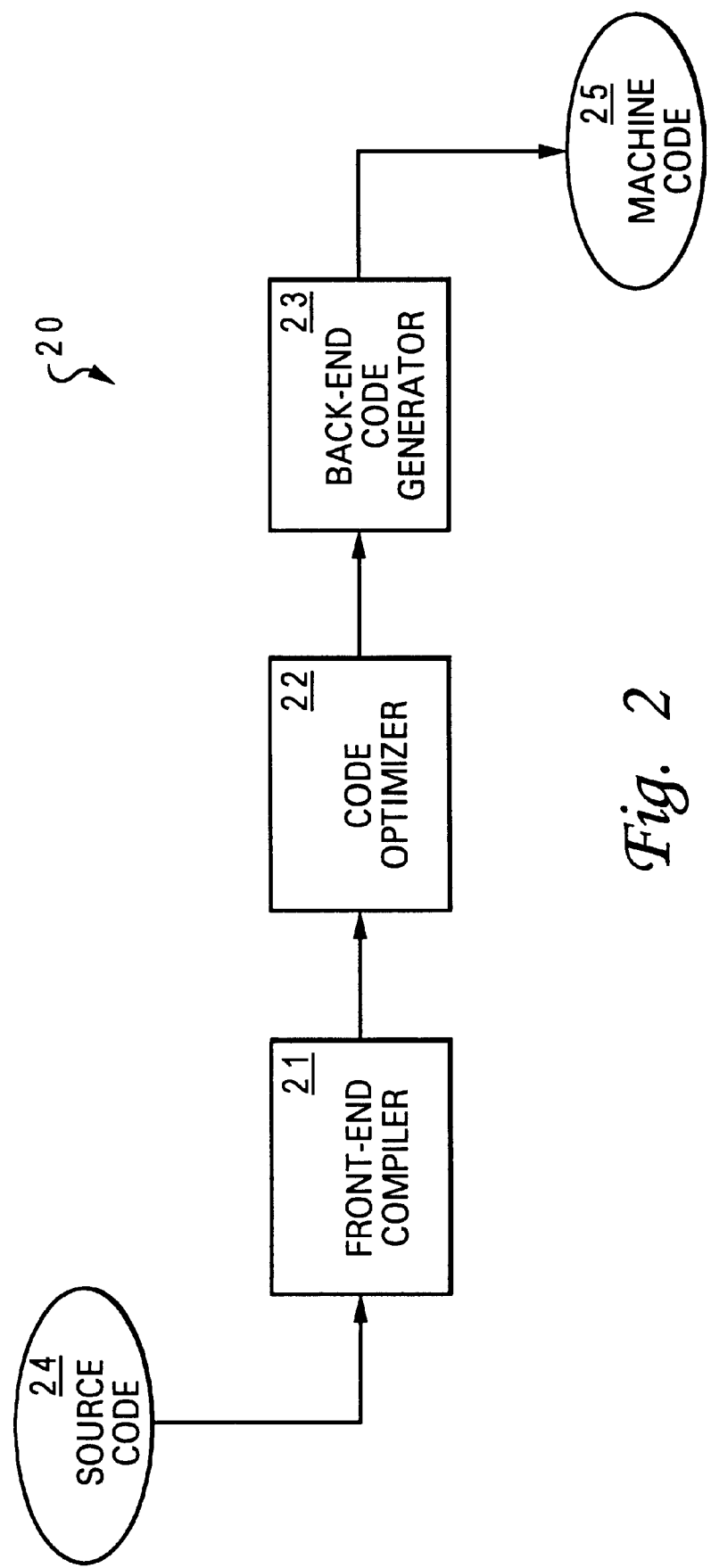
FIG. 2 is a block diagram of an optimizing compiler in accordance with a preferred embodiment of the present invention.

With reference now to FIG. 2, there is illustrated a block diagram of an optimizing compiler in accordance with a preferred embodiment of the present invention. As shown, an optimizing compiler 20 includes a front-end compiler 21, a code optimizer 22, and a back-end code generator 23. After receiving source code 24 written in a high-level programming language as input, front-end compiler 21 performs various lexical, syntactical, and semantic analysis to generate a set of intermediate code that represents the target program. Code optimizer 22 then improves the intermediate code so that faster-running machine code can be formed. Finally, machine code 25 is generated by back-end code generator 23.

Figure 3:
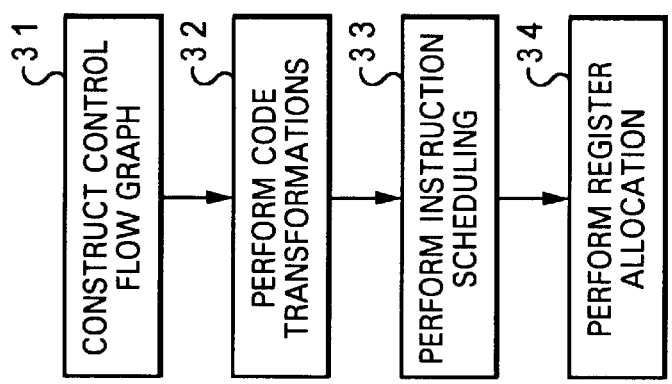
FIG. 3 is a high-level flow diagram of the organization of the code optimizer from FIG. 2, in accordance with a preferred embodiment of the present invention.

Referring now to FIG. 3, there is depicted a high-level flow diagram of the organization of code optimizer 22, in accordance with a preferred embodiment of the present invention. On entry of the intermediate code, a Control Flow Graph is constructed, as shown in block 31. At this stage, code transformations (such as common sub-expression elimination, dead-code elimination, renaming of temporary variables, interchange of two independent adjacent statements, etc.) are performed, as depicted in block 32. Next, instruction scheduling (or pipelining) is performed, as illustrated in block 33. After instruction scheduling, register allocation is subsequently performed, as shown in block 34, and the modified code is written out for back-end code generator 23 (from FIG. 2). The present invention is preferably implemented within the instruction scheduling process depicted in block 33.

Figure 4:
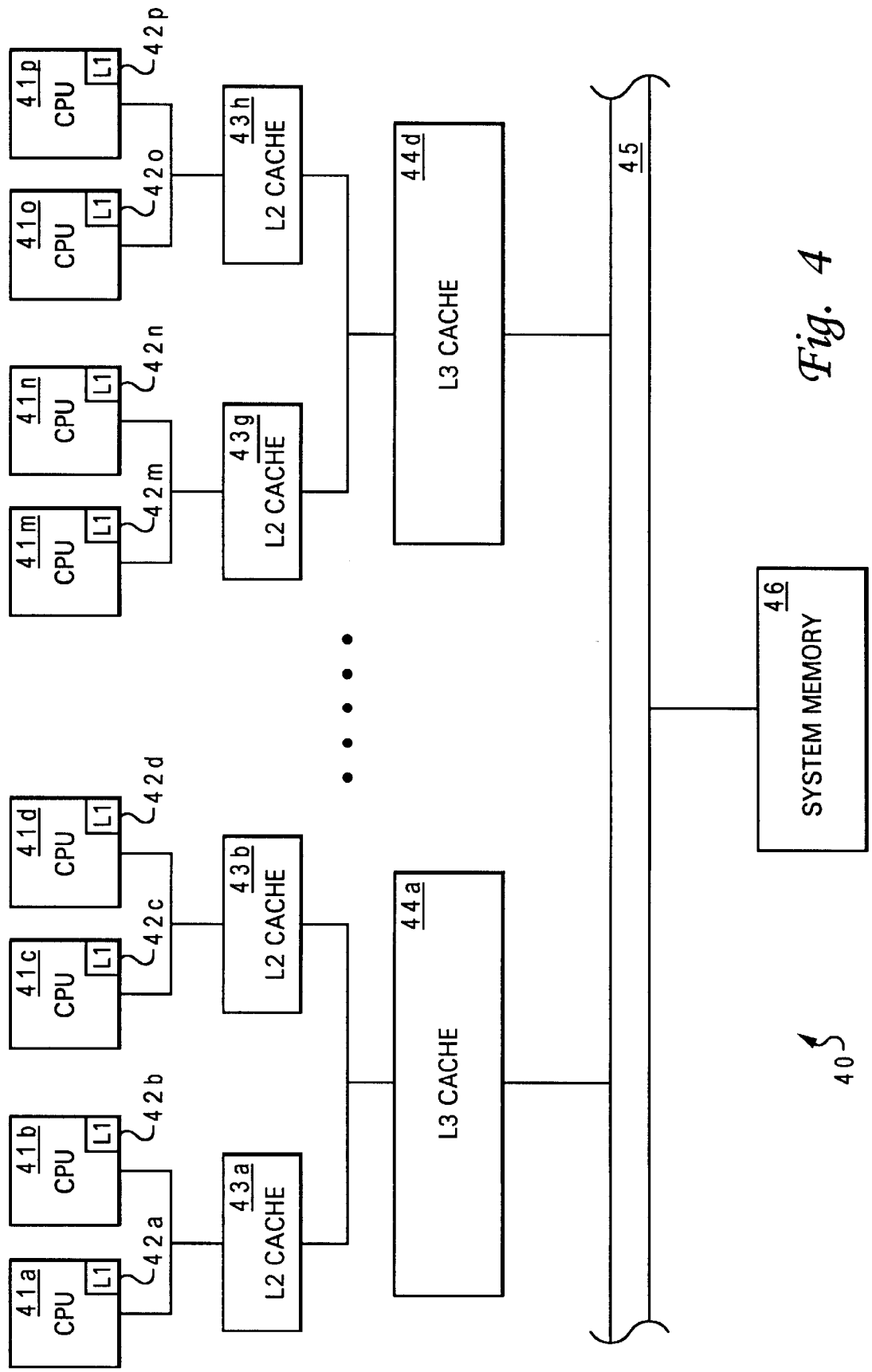
FIG. 4 is a block diagram of an exemplary multiprocessor data processing system to which a STORE instruction generated by the optimizing compiler from FIG. 2 is applicable.

Referring now to FIG. 4, there is depicted a block diagram of an exemplary multiprocessor data processing system to which a STORE instruction generated by the optimizing compiler from FIG. 2 is applicable. As shown, data processing system 40 includes multiple central processor units (CPUs) 41a–41p, and each of CPUs 41a–41p contains a level one (L1) cache. For example, CPU 41a contains an L1 cache 42a, and CPU 41b contains an L1 cache 42b. Each of CPUs 41a–41p (including L1 caches 42a–42p) is coupled to a respective one of level two (L2) caches 43a–43h. Similarly, each of L2 caches 42a–42h is coupled to a respective one of level three (L3) caches 44a–44d. The lowest level of the memory hierarchy as shown in FIG. 4 is a system memory 46.

Each succeeding lower level of the memory hierarchy is capable of storing a larger amount of information than upper levels, but at a higher access latency. For example, L1 caches 42a–42p may each have 512 64-byte cache lines for a total storage capacity of 32 kilobytes, all at a single cycle latency. L2 caches 43a–43h may each have 2048 128-byte cache lines for a total storage capacity of 256 kilobytes, all at a latency of approximately 10–20 cycles. L3 caches 44a–44d may each have 4096 256-byte cache lines for a total storage capacity of one megabyte, all at a latency of approximately 40–60 cycles. Finally, system memory 46 can store tens or hundreds of megabytes of data at a latency of at least 300 cycles. Given the large disparity in access latencies between the various levels of memories within the memory hierarchy, it is advantageous to reduce the frequency of access to lower levels of memories within the memory hierarchy such as system memory 46.

CPUs 41a–41p, L1 caches 42a–42p, L2 caches 43a–43h, and L3 caches 44a–44d are coupled to system memory 46 via an interconnect 45. Interconnect 45, which can be either a bus or a cross-point switch, serves as a conduit for communication transactions between CPUs 41a–41p and other snoopers coupled to interconnect 45. A typical transaction on interconnect 45 begins with a request, which may include a transaction field indicating the type of transaction, source and destination tags indicating the source and intended recipient(s) of the transaction, respectively, and an address and/or data. Each component connected to interconnect 45 preferably snoops all transactions on interconnect 45 and, if appropriate, responds to the request with a snoop response.

In order to obtain valid execution results in data processing system 40, a single view of the contents of memory must be provided to all of CPU 41a–41p by maintaining a coherent memory hierarchy. A coherent memory hierarchy is maintained through the implementation of a selected coherency protocol, such as the conventional MESI protocol. According to the MESI protocol, an indication of a coherency state is stored in association with each coherency granule (e.g., cache line or sector) of at least all upper level memories. Each coherency granule can have one of four states: Modified (M), Exclusive (E), Shared (S), or Invalid (I), which is typically indicated by two bits in a cache directory. The Modified state indicates that a coherency granule is valid only in the cache memory storing the modified coherency granule and that the value of the modified coherency granule has not been written to (i.e., is inconsistent with) system memory 46. When a coherency granule is indicated as Exclusive, the coherency granule is resident in, of all cache memories at that level of the memory hierarchy, only the cache memory having the coherency granule in the Exclusive state. The data in the Exclusive state is consistent with system memory 46, however. If a coherency granule is marked as Shared in the cache directory, the coherency granule is resident in the associated cache and in at least one other cache at the same level of the memory hierarchy, all of the copies of the coherency granule being consistent with system memory 46. Finally, the Invalid state generally indicates that the data and address tag associated with a coherency granule are both invalid.

The state to which each coherency granule is set can be dependent upon a previous state of the cache line, the type of memory access sought by processors to the associated memory address, and the state of the coherency granule in other caches. Accordingly, maintaining cache coherency in data processing system 40 requires that CPUs communicate messages across interconnect 45 indicating an intention to read or write memory locations. For example, when a CPU requires data not resident in its cache(s), the CPU issues a read request on interconnect 45 specifying a particular memory address. The read request is interpreted by its recipients as a request for only a single coherency granule in the lowest level cache in the CPU. The requested cache is then provided to the requester by a recipient determined by the coherency protocol, and the requester typically caches the data in one of the valid states (i.e., M, E, or S) because of the probability that the cache line will again be accessed shortly.

Figure 5:
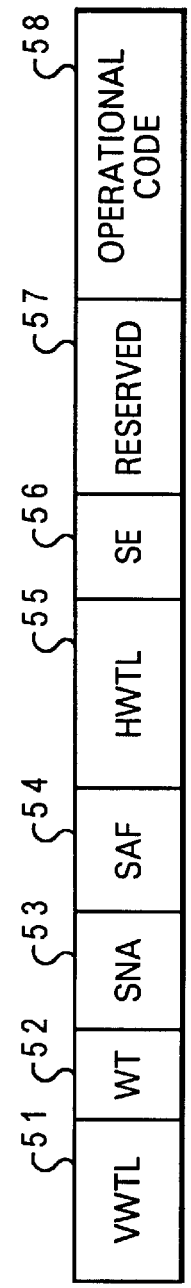
FIG. 5 is a block diagram of a STORE instruction generated by the optimizing compiler from FIG. 2, in accordance with a preferred embodiment of the present invention.

As a preferred embodiment of the present invention, optimizing compiler 20 (from FIG. 2) is capable of converting a first STORE instruction to a second STORE instruction that includes memory hierarchy control bits. These memory hierarchy control bits can be utilized to update data in a multi-level memory hierarchy such as the one shown in FIG. 4. Referring now to FIG. 5, there is illustrated a block diagram of a STORE instruction generated by optimizing compiler 20, in accordance with a preferred embodiment of the present invention. As shown, a STORE instruction 50 includes a Vertical Write-Through Level (VWTL) field 51, a Write-Through (WT) field 55, a Store_but_do_Not_Allocate (SNA) field 53, a Store_And_Flush (SAF) field 54, a Horizontal Write-Through Level (HWTL) field 55, a Snoop Enable (SE) field 56, a reserved field 57, and an operational code (opcode) field 58.

VWTL field 51, having two bits in this implementation, is valid when WT field 55 equals 1. VWTL field 51 indicates the vertical memory level within a memory hierarchy to which a STORE operation should be applied. With the memory hierarchy as shown in FIG. 1, the bits of VWTL field 51 are preferably assigned as shown in Table I.

TABLE I

| VWTL bits | operation |
|---|---|
| 00 | store down to an L1 cache memory |
| 01 | store down to an L2 cache memory |
| 10 | store down to an L3 cache memory |
| 11 | store down to a system memory |

For example, when the bits within VWTL field 51 of a STORE instruction are "00," the data associated with the STORE instruction is coherently placed (i.e., cache states of other cache memories will be adjusted accordingly to reflect the new state) in an L1 cache memory (such as one of L1 caches 45a–45p from FIG. 4) that is associated with the initiating CPU. As another example, when the bits within VWTL field 51 of a STORE instruction are "11," the data from the STORE instruction is placed in an L1 cache memory, an L2 cache memory (such as one of L2 caches 43a–43h from FIG. 4), and an L3 cache memory (such as one of L3 caches 44a–44d from FIG. 4) that are associated with the initiating CPU as well as a system memory (such as system memory 46 from FIG. 4). The number of bits within VWTL field 51 depends of the number of levels of memories within a memory hierarchy.

WT field 55, having one bit, indicates whether or not there should be a write-through at a cache memory. The bits within WT field 55 are preferably assigned as shown in Table II.

TABLE II

| WT bit | operation |
|---|---|
| 0 | if hit, store into current level of cache<br>if miss, allocate entry and store into current level of cache |
| 1 | if (hit AND VWTL < > current level of cache), store into current level of cache and forward STORE to a lower level cache;<br>if (hit AND VWTL = current level of cache), store into current level of cache;<br>if (miss AND VWTL < > current level of cache), conditionally allocate entry and store into current level of cache and forward store to lower level cache;<br>if (miss AND VWTL = current level of cache), allocate entry and store into current level of cache |

When the WT bit equals zero (meaning no write-through), the data associated with a STORE instruction is stored in the current level of a cache memory if there is a cache "hit" at the current level; otherwise, the data is stored in the current level of the cache memory after a cache line has been allocated if there is a cache "miss" at the current level.

When the WT bit equals one (meaning write-through), the data associated with a STORE instruction is stored in the current level of a cache memory if there is a cache "hit" and the VWTL bits point to the current level of the cache memory; otherwise, the data is also forwarded to the next lower level of the cache memory if there is a cache "hit" but the VWTL bits do not point to the current level of the cache memory.

However, if there is a cache "miss" and the VWTL bits point to the current level of the cache memory, the data is stored in the current level of the cache memory after a cache line has been allocated. Otherwise, if there is a cache "miss" and the VWTL bits do not point to the current level of the cache memory, the data may be stored in the current level of the cache memory after a cache line has been allocated, depending on the status of SNA field 53 and SAF field 54 described infra, and the data is also forwarded to the next lower level of the cache memory.

SNA field 53, having a single bit, indicates whether data should be stored in the current level of a memory hierarchy when there is a cache "miss." The bits of SNA field 53 are preferably assigned as shown in Table III. When the SNA bit equals zero, the data associated with a STORE instruction is stored in the current level of a cache memory regardless of whether there is a cache "hit" or "miss." When the SNA bit equals one, the data is stored in the current level of a cache memory if there is a cache "hit."

TABLE III

| SNA bit | operation |
|---|---|
| 0 | if hit, store into current level of cache<br>if miss, store into current level of cache |
| 1 | if hit store into current level of cache<br>if (miss AND VWTL < > current level of cache), do NOT store into current level of cache and pass store to lower level of cache<br>if (miss AND VWTL = current level of cache), allocate entry and store into current level of cache |

If there is a cache "miss" when the SNA bit equals one, the data is stored in the current level of the cache memory after a cache line has been allocated when the VWTL bits point to the current level of the cache memory. However, when the VWTL bits do not point to the current level of the cache memory, the data is forwarded to the next lower level of the cache memory, without storing at the current level of the cache memory.

SAF field 54, having a single bit, indicates the level of a memory hierarchy at which the data from a STORE instruction should be stored, above which whether the data should be flushed. The bits of SAF field 54 are preferably assigned as shown in Table IV. When the SAF bit equals zero, the data associated with a STORE instruction is stored in the current level of a cache memory if there is a cache "hit;" otherwise, the data is stored in the current level of the cache memory after a cache line has been allocated if there is a cache "miss."

TABLE IV

| SAF bit | operation |
|---|---|
| 0 | if hit, store into current level of cache<br>if miss, allocate entry and store into current level of cache |
| 1 | if (hit AND VWTL < > current level of cache), store into current level of cache then cast out the line to the lower level cache;<br>if (hit AND VWTL = current level of cache), store into current level of cache;<br>if (miss AND VWTL < > current level of cache), pass store to lower level cache (don't allocate current cache level)<br>if (miss AND VWTL = current level of cache), allocate entry and store into current level of cache |

When the SAF bit equals one, the data associated with a STORE instruction is stored in the current level of the cache memory if there is a cache "hit" and the VWTL bits point to the current level of the cache memory; otherwise, the data is stored in the current level and then the cache line is cast out to the next lower level of the cache memory if there is a cache "hit" and the VWTL bits do not point to the current level of the cache memory. However, if there is a cache "miss" and the VWTL bits point to the current level of the cache memory, the data is stored in the current level of the cache memory after a cache line has been allocated; otherwise, the data is forwarded to the next lower level of the cache memory without allocating a cache line at the current level of the cache memory if there is a cache "miss" and the VWTL bits do not point to the current level of the cache memory.

HWTL field 55, having two bits, is valid when WT field 55 equals one. HWTL field 51 indicates the horizontal cache level to which a STORE operation should be applied. The bits within HWTL field 51 are preferably assigned as shown in Table V.

TABLE V

| HWTL bits | operation |
|---|---|
| 00 | disabled, horizontal caches that are Shared should go to Invalid |
| 01 | horizontal caches that are Shared should be updated with new store data and stay Shared |
| 10 | horizontal caches that are Shared should be updated with new store data and stay Shared as well as caches one level up |
| 11 | horizontal caches that are Shared should be updated with new store data and stay Shared as well as caches two levels up |

For example, if the WT bit equals one, the VWTL bits equal "10," and the HWTL bits equal "10," the VWTL bits will cause the data associated with a STORE instruction to be stored in the L1 and L2 caches that are associated with the initiating CPU, and the HWTL bits will cause all snoopers that have data in a Shared state to update their respective L1 and L2 caches with the new data associated with the STORE instruction, allowing these caches to stay in a Shared state.

SE field 56, having a single bit, controls whether or not a STORE operation needs to be snooped. In order to save directory bandwidth in a software partitioned system, it is useful to know ahead whether or not a STORE operation needs to be snooped by a snooper. This is because a cache memory in one partition is not required to share data with another cache memory in another partition. The bits within SE field 56 are preferably assigned as shown in Table VI.

TABLE VI

| SE bits | operation |
|---|---|
| 0 | snoopers on system bus do NOT have to snoop system bus operations |
| 1 | snoopers on system bus have to snoop system bus operations |

Reserved field 57 reserves a number of bits within instruction 50 for future usage. Opcode field 58 defines the instruction type and operation of instruction 50.

As has been described, the present invention provides an optimizing compiler for generating STORE instructions having memory hierarchy control bits to be utilized within a multiprocessor data processing system. With the present invention, a more versatile control of the storing of data in each level of memory within a multi-level memory hierarchy can be furnished, via a STORE instruction, at the time of software compilation. The specific value for the memory hierarchy control bits within each STORE instruction can be determined in view of the totality of an entire software program. For example, the compiler can set the value for the memory hierarchy control bits within each STORE instruction based on data utilization of variables, locks, and other constructs.

For the purpose of illustration, the present invention is demonstrated using a multiprocessor data processing system having three levels of cache memories. However, it is understood that the features of the present invention may be applicable in any multiprocessor data processing system having various levels of cache memories.

While the invention has been particularly shown and described with reference to a preferred embodiment, it will be understood by those skilled in the art that various changes in form and detail may be made therein without departing from the spirit and scope of the invention.

What is claimed is:

1. A computer program product capable generating instructions having memory hierarchy control bit to be utilized in a multi-level memory hierarchy within a data processing system, said computer program product comprising:

program code means for converting a first instruction to a second instruction;

program code means for providing an operation code field within said second instruction for indicating an updating operation; and program code means for providing a vertical write-through level field within said instruction for indicating a vertical memory level within said multi-level memory hierarchy to which said updating operation should be applied.

2. The computer program product according to claim 1, wherein said computer program product further includes a program code means for providing a horizontal write-through level field within said second instruction for indicating a horizontal memory level within said multi-level memory hierarchy to which said updating operation should be applied.

3. The computer program product according to claim 1, wherein said computer program product further includes a program code means for providing a write-through field within said second instruction for indicating said updating operation should be applied when said write-through field is set.

4. The computer program product according to claim 1, wherein said computer program product further includes a program code means for providing a snoop enable field within said second instruction for controlling whether or not said updating operation needs to be snooped from a system bus.

5. The computer program product according to claim 1, wherein said computer program product further includes a program code means for providing a store but do not allocate field within said second instruction for indicating whether data should be stored in a current level of said multi-level memory hierarchy when there is a cache "miss."

6. The computer program product according to claim 1, wherein said computer program product further includes a program code means for providing a store and flush field within said second instruction for indicating a level of said multi-level memory hierarchy at which said data should be stored, above which whether said data should be flushed.

7. The computer program product according to claim 1, wherein said first and second instructions are STORE instructions.

* * * * *